United States Patent Office 2,739,907
Patented Mar. 27, 1956

2,739,907

PROCESS FOR IMPARTING AN IMPROVED FINISH TO THE SURFACE OF METALS BY MEANS OF DIFFUSION TREATMENT

Rudolf Nowak, Waldbrol-Hermesdorf, Rhineland, Germany

No Drawing. Application July 12, 1951, Serial No. 236,452

Claims priority, application Germany July 20, 1950

6 Claims. (Cl. 117—106)

The invention relates to a process for the surface treatment of metals, including iron and steel, by means of which metals such as silicon, titanium, tin, chromium, antimony, zinc, aluminium and the like and metalloids such as carbon, boron, nitrogen and the like are diffused from the gas phase into the surface.

If a volatile compound of the material to be diffused in, for example silicon tetrachloride, is allowed to act in the hitherto known manner, at corresponding temperature, upon a metal surface, for example iron, then a diffusion of the silicon into the iron takes place. The replacement reaction thereby taking place (1) $SiCl_4 + 2Fe \rightleftharpoons Si + 2FeCl_2$ takes place slowly and accordingly the speed of diffusion remains extremely small.

From the stoichiometric ratio 2Fe:Si it is seen that, expressed volumetrically, instead of 14.67 parts of iron only 11.67 parts of silicon enter in, so that on account of the loss of material thereby taking place, the newly produced silicon-containing coating can never be free from cracks and pores.

It has been ascertained that the reversible Reaction 1 is very much hindered even by the smallest quantities of the ferrous chloride ($FeCl_2$) produced and accordingly the speed of diffusion becomes extremely slow.

The present invention is based on the observation that if there is added to the silicon tetrachloride a certain amount of chlorine gas, the ferrous chloride ($FeCl_2$) which is formed is chlorinated in statu nascendi to ferric chloride ($FeCl_3$). The reaction which has now become irreversible therefore proceeds only in the desired direction. The result of this is an extremely high speed of the diffusion operation.

The quantity of chlorine added is of decisive importance in this case in correspondence with the law of mass action. The following reaction then takes place:

(2) $4SiCl_4 + 6Fe + Cl_2 \rightarrow 4Si + 6FeCl_3$

From this reaction equation it is seen that together with 4 mol of $SiCl_4$, 1 mol of $Cl_2$ must be brought into reaction and that instead of 6Fe 4Si enter in, so that, expressed volumetrically, 4.3 parts of iron are replaced by 4.8 parts of silicon. It is seen from this that in this case, in contradistinction to the hitherto known process, in the replacement reaction an increase of material takes place, whereby the compactness of the silicon-containing coating produced is positively guaranteed.

It has also been ascertained that, for example, silicon-containing protective coatings which have been produced by the hitherto known diffusion process by the action of silicon tetrachloride on iron or steel with or without the addition of hydrogen or nitrogen, are not sufficiently well anchored in the basic metal. The reason for this is as follows:

The known chemical Reaction 1 is, as already stated, reversible, and even a small partial pressure of ferrous chloride is sufficient in order to reduce its speed considerably. When hydrogen is added to the silicon tetrachloride, then in accordance with the reaction (3) $SiCl_4 + 2H_2 \rightleftharpoons Si + 4HCl$ (and various silanes) although the quantity of silicon per unit time, which separates on the surface of the object to be metallised, can be increased the speed of diffusion into the base metal cannot be increased. The result of this is that the coating produced, although it may be of considerable thickness, is only weakly anchored in the base metal surface.

On these grounds all processes which work in this manner with the addition of hydrogen orof another reducing gas, must rather be considered as processes in which essentially a "plating from the gas phase" takes place and only in a small part as "diffusion processes."

From a technological point of view it is in this case of importance that the dimensional stability of the object to be treated is not guaranteed by such a process but only by a pure diffusion process.

Metallographic examination has shown that in accordance with Reaction 2 applied according to the present invention, after only a few seconds the silicon has diffused in along the grain boundaries to the extent of 0.1 mm. and the surface has been coated with a very thin but compact ferrosilicon layer.

The layer is accordingly well anchored in the base metal. It can be deformed together with the base metal without tearing or splitting apart. This has been proved in practice by corresponding deep-drawing operations.

It has also been proved that iron treated according to the present process is of good capacity for welding and is stable to heat.

The above diffusion process which has been described by way of example for the use of silicon, can also be applied in a similar manner with other metals, as for example tin, chrominum, antimony, zinc, aluminium and so on.

In the same manner as metals metalloids can also be used according to the invention with considerable increase of the speed of diffusion into the base metal.

When, for example, gases containing carbon, such as carbon tetrachloride, are allowed to act at corresponding temperature upon a iron surface, then a diffusion of the carbon into the iron takes place. The replacement reaction thereby proceeding takes place slowly and accordingly the speed of diffusion remains extremely small.

If however in accordance with the present invention a certain quantity of chlorine gas is added to the carbon tetrachloride, then a considerable increase of the speed of the diffusion process takes place. The quantity of chlorine added is of decisive importance in this case in accordance with the law of mass action.

The process of diffusion described by way of example in the case of a volatile carbon compound into iron as base metal, is of general application. In the described manner in addition to carbon also other metalloids can be used such as nitrogen, phosphorus, sulphur, boron, arsenic, antimony and the like and also in addition to iron other base metals can be used as for example copper or tin, compounds being used for the diffusion which form a gas phase at the diffusion temperature and care being taken by corresponding addition of halogens that the halogen compound formed from the base metal, by continuous influence of the chemical equilibrium, causes the reaction always to proceed in the direction favourable for the diffusion of the metalloid into the base metal.

According to a further feature of the invention in working according to the present process it is of advantage to activate the surface of the base metal before the diffusion treatment. The activation is carried out in the conventional manner, for example by oxidation and subsequent reduction of the surface. This pretreatment has the effect of accelerating the speed of diffusion and improving the uniformity of the diffusion layers.

According to a still further feature of the invention the diffusion processes, which depend upon true chemical replacement reactions, can be considerably accelerated when they are caused to take place with simultaneous application of supersonic waves. Whereas, for example, for the production of a silicon diffusion into iron by means of silicon tetrachloride by known processes, a treating time of several hours is necessary for the production of a noteworthy silicon-containing layer, the same effects are obtained in the diffusion process according to the present invention in only a few minutes when the body to be treated is, during the treatment with silicon tetrachloride, subjected to supersonic waves, for example of 30,000 to 50,000 cycles per second. Obviously the effect of the supersonic waves is positively to increase the characteristic frequency of the molecules of the substances taking part and thereby both an increase of the chemical reaction velocity takes place and also an increase of the speed of diffusion.

From an industrial point of view the present process offers the advantage that owing to the increase of the speed of diffusion the treatment of the objects can be carried out by a continuous method. In such an operation the gases can be passed in circulation and also with continuous regeneration and separation of the reaction products.

In this case, as may be suitable, the gases may be passed in co-current or counter-current or partly in co-current and partly in counter-current to the objects to be treated, through the treating chamber. The operating conditions need only be maintained such that the ratio of the quantities of gases at the reaction temperature always corresponds to conditions favourable for the reaction and that the gaseous reaction product is regenerated in a cycle process.

By this means the component which diffuses penetrates sufficiently into the surface so that precautions are taken for a good anchoring of the protective layer. In addition the economy of the process is considerably improved compared with hitherto known processes on account of the cycle operation.

The regeneration and working up of the reaction products may be described by way of example in the case of the silicon treatment of iron and steel by means of silicon tetrachloride.

In this case there is produced as end product ferric chloride, which leaves the reaction chamber in the state of vapour and is regenerated by means of ferrosilicon in a stationary hollow cylinder.

Ferrosilicon powder is allowed to fall in suspension in the hollow cylinder while the $FeCl_3$ in vapour form coming from the reaction chamber is passed upwards in countercurrent to the ferrosilicon. According to the reaction (4) $\quad 3Si + 4FeCl_3 \rightarrow 3SiCl_4 + 4Fe + 42 kcal$ there are thereby produced gaseous silicon tetrachloride and iron powder.

From the reaction equations (5) $\quad 8SiCl_4 + 12Fe + 2Cl_2 \rightarrow 8Si + 12FeCl_3$ (metallisation reaction)

and (6) $\quad 12FeCl_3 + 9Si \rightarrow 9SiCl_4 + 12Fe$ (regeneration reaction)

it is seen that in the regeneration in addition to the 8 mols of $SiCl_4$ necessary for the metallisation, there is produced an excess of 1 mol of $SiCl_4$ and a quantity of 12 mols of chemically pure iron. This excess of 1 mol of $SiCl_4$ and the 12 mols of Fe produced are withdrawn from the cycle process as main or secondary products and can be applied for other purposes.

I claim:

1. A process for imparting an improved finish to a base metal surface by a diffusion treatment, which comprises contacting said base metal surface selected from the group consisting of iron, copper and tin with a vaporized halide of a polyvalent element capable of chemically replacing the base metal at said surface, and sufficient free halogen vapor to assure complete halogenation of the base metal halide resulting from the replacement reaction, said treatment being effected at an elevated temperature above the vaporization point of the base metal halide but below the melting point of the base metal.

2. A process as claimed in claim 1, wherein the base metal surface to be treated is first activated by oxidizing and then reducing said surface.

3. A process as claimed in claim 1, wherein the base metal surface is subjected to supersonic vibration during the diffusion treatment.

4. A process as claimed in claim 1, wherein a chloride of the replacing agent and chlorine are used, thus forming a chloride of the base metal.

5. A process for imparting an improved finish to a ferrous base metal surface by a diffusion treatment, which comprises contacting said ferrous base metal surface with vaporized silicon tetrachloride and chlorine in about the stoichiometric proportion of $4SiCl_4:Cl_2$, said treatment being effected at an elevated temperature above the vaporization point of the ferric chloride so formed, but below the melting point of the ferrous base metal.

6. A process as claimed in claim 5, wherein the ferric chloride vapors formed are regenerated with ferrosilicon and, after removal of iron and excess of silicon tetrachloride, the regenerated vapors of silicon tetrachloride are recycled to the diffusion treatment.

References Cited in the file of this patent

UNITED STATES PATENTS

| | | |
|---|---|---|
| 1,939,712 | Mahoux | Dec. 19, 1933 |
| 1,964,322 | Hyde | June 26, 1934 |
| 2,313,410 | Walther | Mar. 9, 1943 |
| 2,438,892 | Becker | Apr. 6, 1948 |
| 2,501,051 | Henderson et al. | Mar. 21, 1950 |
| 2,536,774 | Samuel | Jan. 2, 1951 |